(12) United States Patent
Murakoshi et al.

(10) Patent No.: US 9,471,146 B2
(45) Date of Patent: Oct. 18, 2016

(54) APPARATUS AND METHOD FOR OPERATING A USER INTERFACE OF A DEVICE

(71) Applicant: SONY CORPORATION, Tokyo (JP)

(72) Inventors: Sho Murakoshi, San Diego, CA (US); Kazumoto Kondo, San Diego, CA (US); Peter Shintani, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 199 days.

(21) Appl. No.: 13/786,641

(22) Filed: Mar. 6, 2013

(65) Prior Publication Data

US 2014/0253460 A1 Sep. 11, 2014

(51) Int. Cl.
G06F 3/041 (2006.01)
G06F 3/01 (2006.01)
G06F 3/046 (2006.01)
G06F 3/0488 (2013.01)

(52) U.S. Cl.
CPC .............. *G06F 3/017* (2013.01); *G06F 3/046* (2013.01); *G06F 3/04883* (2013.01); *G06F 3/041* (2013.01); *G06F 2203/04101* (2013.01)

(58) Field of Classification Search
USPC ................... 345/156–178; 178/18.01, 18.03
See application file for complete search history.

(56) References Cited

U.S. PATENT DOCUMENTS

| | | | |
|---|---|---|---|
| 6,283,860 B1 * | 9/2001 | Lyons et al. | 463/36 |
| 7,656,394 B2 | 2/2010 | Westerman et al. | |
| 2007/0085828 A1 * | 4/2007 | Schroeder et al. | 345/158 |
| 2007/0121097 A1 * | 5/2007 | Boillot | 356/28 |
| 2007/0211022 A1 * | 9/2007 | Boillot | 345/156 |
| 2007/0211023 A1 * | 9/2007 | Boillot | 345/156 |
| 2008/0100572 A1 | 5/2008 | Boillot | |
| 2009/0265670 A1 | 10/2009 | Kim et al. | |
| 2010/0315438 A1 * | 12/2010 | Horodezky | 345/661 |
| 2011/0057953 A1 * | 3/2011 | Horodezky | 345/647 |
| 2011/0090147 A1 * | 4/2011 | Gervais et al. | 345/157 |

FOREIGN PATENT DOCUMENTS

| | | |
|---|---|---|
| JP | 2009-301302 A | 12/2009 |
| JP | 2011-134271 A | 7/2011 |
| WO | 2011/160079 A | 12/2011 |

OTHER PUBLICATIONS

Determining the Winding of a Polygon Given as a Set of Ordered Points Sunday, Apr. 26—Jnorton—element 84.*

Office Action received for Japanese Patent Application No. 2015-561553, mailed on Jun. 13, 2016, 5 Pages of Office Action Including 2 pages of English translation.

* cited by examiner

*Primary Examiner* — Jason Olson
*Assistant Examiner* — Sosina Abebe
(74) *Attorney, Agent, or Firm* — Chip Law Group (57) ABSTRACT

Certain aspects of an apparatus and a method for operating a user interface of a device may comprise a plurality of sensors coupled to a surface. The plurality of sensors may detect a movement of an object within a pre-defined distance from the surface. The one or more sensors may generate one or more signals in response to the detected movement. One or more processors that are communicatively coupled to the plurality of sensors may generate a control signal corresponding to the one or more generated signals to operate the user interface of the device.

23 Claims, 7 Drawing Sheets

APPARATUS AND METHOD FOR OPERATING A USER INTERFACE OF A DEVICE

CROSS-REFERENCE TO RELATED APPLICATIONS/INCORPORATION BY REFERENCE

This application makes reference to U.S. patent application Ser. No. 13/736,241 filed on Jan. 8, 2013, which is hereby incorporated herein by reference in its entirety.

FIELD

Various embodiments of the disclosure relate to a user interface. More specifically, various embodiments of the disclosure relate to an apparatus and method for operating a user interface of a device.

BACKGROUND

Generally, devices include a user interface that enables users to interact with and operate the device. A user interface may function as an input mechanism that may receive a user input. In certain scenarios, a user interface may also function as an output mechanism that displays results of an operation performed based on a user input. Examples of a user interface may be a button on a device and/or a remote control associated with a device, a touch screen, a voice-based user interface, a display screen, and the like. Generally, a user interface of a device may be integrated with the device and/or may be implemented on another device communicatively coupled to the device. A user may operate a user interface of a device by directly interacting with the user interface. Moreover, a user may be required to remember a complex sequence of keys of a user interface and/or navigate through menu hierarchies to operate a user interface. Furthermore, a user interface implemented using a certain technology may restrict the ways in which a user may operate the user interface.

Further limitations and disadvantages of conventional and traditional approaches will become apparent to one of skill in the art, through comparison of described systems with some aspects of the present disclosure, as set forth in the remainder of the present application, with reference to the drawings.

SUMMARY

An apparatus and/or a method for operating a user interface of a device substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in an apparatus and/or a method for operating a user interface of a device. The apparatus may detect a movement of an object within a pre-defined distance from a surface. The apparatus may generate one or more signals in response to the detected movement. The apparatus may generate a control signal corresponding to the one or more generated signals to operate the user interface of the device.

The apparatus may track the movement of the object along a path within the pre-defined distance. The tracking may comprise determining one or more locations of the object along the path. The apparatus may determine a pair of coordinates in a two-dimensional coordinate system corresponding to each of the one or more determined locations. Each of the determined pair of coordinates is indicative of position of each of the determined one or more locations in the two-dimensional coordinate system. The apparatus may determine a closed region formed by a plurality of the determined pair of coordinates in the two-dimensional coordinate system. The apparatus may determine a polarity of an area of the determined closed region. The apparatus may determine a direction of the movement based on the determined polarity of the area. The determined direction of the movement corresponds to an operation associated with the device.

Figure 1:
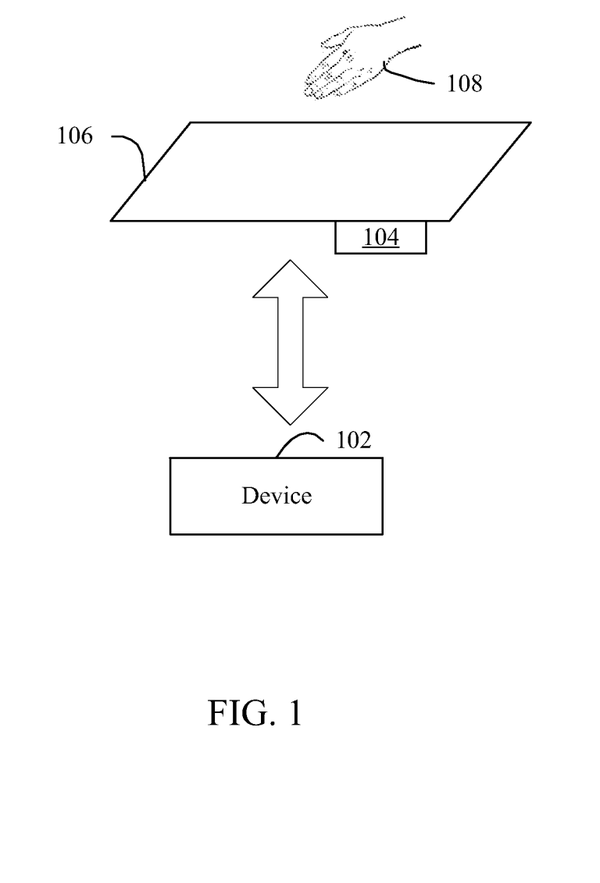
FIG. 1 is a block diagram illustrating operating a user interface of a device based on a movement of an object within a pre-defined distance, in accordance with an embodiment of the disclosure.

FIG. 1 is a block diagram illustrating operating a user interface of a device based on a movement of an object within a pre-defined distance, in accordance with an embodiment of the disclosure. In reference to FIG. 1, there is shown a device 102, an apparatus 104 for operating a user interface of the device 102, a surface 106, and an object 108 for interacting with the surface 106.

The device 102 may correspond to a machine that may be operated by a user. The device 102 may perform one or more operations when operated by a user. The device 102 may be an electrical device, a mechanical device, an electronic device, and/or a combination thereof. Examples of the device 102 may include, but are not limited to, mobile phones, laptops, tablet computers, televisions, Personal Digital Assistant (PDA) devices, vehicles, home appliances, media playing devices, and/or any other device operable by a user.

The apparatus 104 may comprise suitable logic, circuitry, interfaces, and/or code that may be operable to operate the user interface of the device 102 based on a movement of the object 108 within a pre-defined distance from the surface 106. In an embodiment, the pre-defined distance may be located above and/or below the surface 106. The apparatus 104 may create an operating space at the pre-defined distance above the table. An operating space corresponds to a three-dimensional (3D) volume relative to the surface 106 within which a user may move the object 108. The apparatus 104 may determine the pre-defined distance based on the sensitivity of a plurality of sensors associated with the apparatus 104.

In an embodiment, the apparatus 104 may be communicatively coupled with the device 102 via a wired or wireless communication network. Examples of the communication network may include, but are not limited to, a Bluetooth network, a Wireless Fidelity (Wi-Fi) network, and/or a ZigBee network. In another embodiment, the apparatus 104 may be integrated with the device 102.

The surface 106 may correspond to any surface. The surface 106 may be composed of various materials, such as wood, glass, plastic, metal, cardboard, and concrete. Examples of the surface 106 may include, but are not limited to, a table top, a wall, a floor, a cover of the device 102, and/or any surface. In an embodiment, the surface 106 may be a part of the device 102. In an embodiment, the surface 106 may not be a part of the device 102. In another embodiment, the surface 106 may be a surface on which the device 102 is placed and/or fixed. In another embodiment, the device 102 may not be in contact with the surface 106.

The apparatus 104 may be coupled to the surface 106. In an embodiment, the apparatus 104 may be fixed on the surface 106. For example, a table top may be used as the surface 106. The apparatus 104 may be fixed above and/or below the table top. In another embodiment, the apparatus 104 may be embedded in the surface 106. In another embodiment, the surface 106 may be an integrated part of the apparatus 104. For example, a cover of the apparatus 104 may correspond to the surface 106. Notwithstanding, the disclosure may not be so limited and any part of the body of the apparatus 104 may correspond to the surface 106 without limiting the scope of the disclosure.

The apparatus 104 may effectively convert a surface into an input mechanism that enables a user to operate a user interface of the device 102. For example, the apparatus 104 may be coupled to a table. The apparatus 104 may create an operating space at a pre-defined distance above the table. User interface controls of the device 102 may be mapped to locations within the pre-defined distance. A user may operate the user interface of the device 102 by interacting with the table within the pre-defined distance.

A user may interact with the surface 106 in many ways using one or more objects, such as the object 108. Examples of the object 108 may include, but are not limited to, a hand of a user, a stylus, a prosthetic device, and/or any object capable of moving relative to the surface 106. A user may move the object 108 relative to the surface 106 within a pre-defined distance. Examples of the movement of the object 108, relative to the surface 106 may include, but are not limited to, a clockwise and/or a counter-clockwise movement of the object 108 above and/or below the surface 106. A clockwise movement and/or a counter-clockwise movement may be such that a closed region is formed as a result of the movement.

In an embodiment, a user may move the object 108 on the surface 106 such that the object 108 is in contact with the surface 106. In another embodiment, a user may move the object 108 above the surface 106 such that the object 108 is not in contact with the surface 106. In another embodiment, a user may move the object 108 below the surface 106 such that the object 108 is not in contact with the surface 106. Based on the movement, a user may operate one or more operations of the device 102.

In operation, the apparatus 104 may be coupled to the surface 106. The apparatus 104 may create an operating space at a pre-defined distance above and/or below the surface 106 for moving the object 108 relative to the surface 106. A user may move the object 108 relative to the surface 106 within the pre-defined distance such that a closed region is formed as a result of the movement. The apparatus 104 may detect the movement of the object 108. In response to the detected movement, the apparatus 104 may generate one or more signals. The apparatus 104 may generate a control signal corresponding to the one or more generated signals. The apparatus 104 may communicate the generated control signal to the device 102 to operate a user interface of the device 102.

Figure 2:
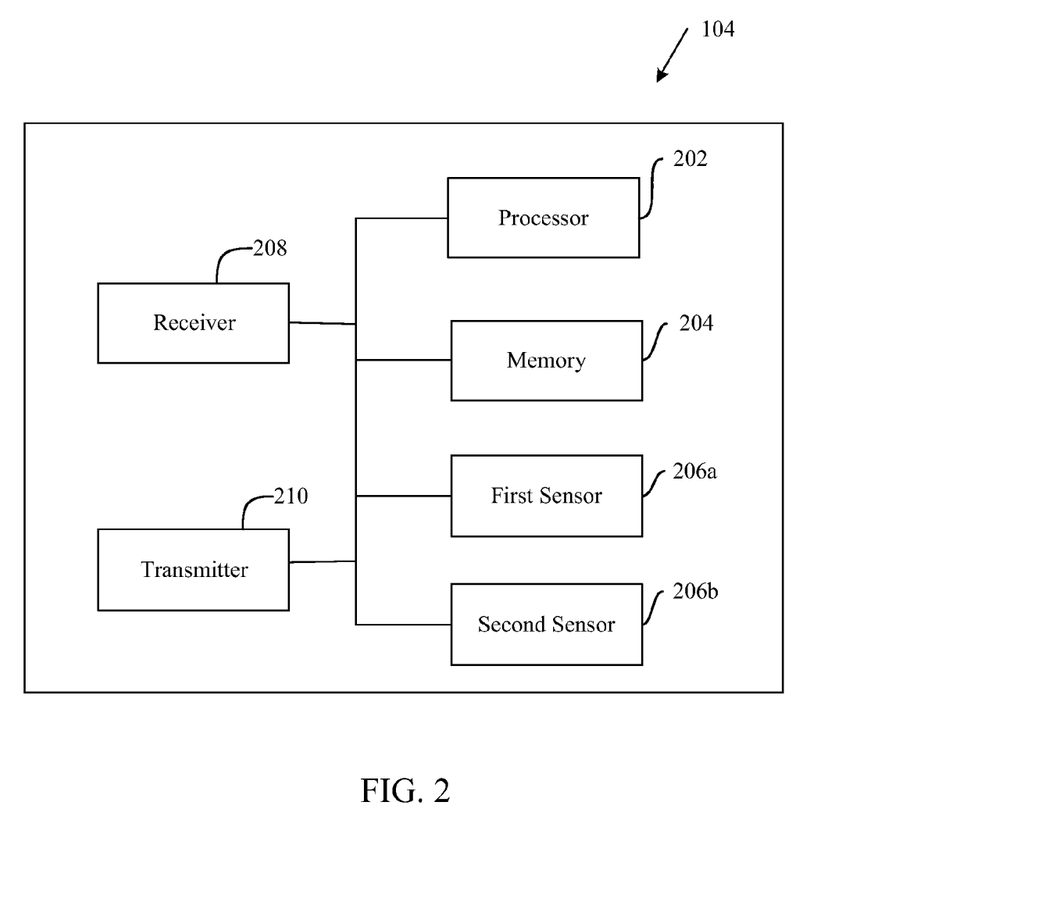
FIG. 2 is a block diagram of an exemplary apparatus for operating a user interface of a device, in accordance with an embodiment of the disclosure.

FIG. 2 is a block diagram of an exemplary apparatus for operating a user interface of a device, in accordance with an embodiment of the disclosure. The block diagram of FIG. 2 is described in conjunction with the block diagram of FIG. 1.

In reference to FIG. 2, there is shown the apparatus 104. The apparatus 104 may comprise one or more processors, such as a processor 202, a memory 204, at least one pair of sensors (such as a first sensor 206a and a second sensor 206b), a receiver 208, and a transmitter 210. The first sensor 206a and the second sensor 206b may be collectively referred to as sensors 206.

The processor 202 may be communicatively coupled to the memory 204, and the sensors 206. Further, the receiver 208 and the transmitter 210 may be communicatively coupled to the processor 202, the memory 204, and the sensors 206.

The processor 202 may comprise suitable logic, circuitry, and/or interfaces that may be operable to execute at least one code section stored in the memory 204. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computer (CISC) processor.

The memory 204 may comprise suitable logic, circuitry, interfaces, and/or code that may be operable to store a machine code and/or a computer program having the at least one code section executable by the processor 202. Examples of implementation of the memory 204 may include, but are not limited to, Random Access Memory (RAM), Read Only Memory (ROM), Hard Disk Drive (HDD), and/or a Secure Digital (SD) card. The memory 204 may further be operable to store data, such as configuration settings of the apparatus 104, settings of the sensors 206, direction-operation mapping data, and/or any other data.

The sensors 206 may comprise suitable logic, circuitry, interfaces, and/or code that may be operable to detect a movement of the object 108. Examples of the sensors 206 may include, but are not limited to, an ultrasonic sensor, an infra-red sensor, and/or any sensor operable to detect a movement of the object 108 and generate signals in response to the detected movement. In an embodiment, the first sensor 206a and the second sensor 206b may form a pair of transmitter and receiver. For example, the first sensor 206a and the second sensor 206b may be ultrasonic sensors. The first sensor 206a may act as an ultrasonic transmitter that transmits ultrasonic signals. The second sensor 206b may act as an ultrasonic receiver that receives the ultrasonic signals transmitted by the first sensor 206a. In another example, the first sensor 206a and the second sensor 206b may be infra-red sensors. The first sensor 206a may act as an infra-red transmitter that transmits infra-red signals. The second sensor 206b may act as an infra-red receiver that receives the infra-red signals transmitted by the first sensor 206a. Notwithstanding, the disclosure may not be so limited and any other sensors operable as a pair of transmitter-receiver may be used without limiting the scope of the disclosure.

In an embodiment, the sensors 206 may be an integral part of the apparatus 104. The apparatus 104 may be coupled to the surface 106 in such a manner that the sensors 206 may be in contact with the surface 106. In another embodiment, the sensors 206 may be external to the apparatus 104. The sensors 206 may be coupled to and/or embedded in the surface 106. In an embodiment, the apparatus 104 may be communicatively coupled to the sensors 206 via a wired or wireless communication medium. Examples of the communication medium may include, but are not limited to, a Bluetooth network, a Wireless Fidelity (Wi-Fi) network, and/or a ZigBee network.

In an embodiment, the first sensor 206a and the second sensor 206b are positioned orthogonally. In an embodiment, a manufacturer of the apparatus 104 may specify the position of the sensors 206 on the surface 106. In another embodiment, a user associated with the apparatus 104 may customize the position of the sensors 206 on the surface 106.

In another embodiment, the first sensor 206a and the second sensor 206b may be infra-red sensors. The first sensor 206a and the second sensor 206b may be coupled to the surface 106, such that an infra-red signal from the first sensor 206a is transmitted to the second sensor 206b via air above the surface 106. A region above the surface 106 via which the infra-red signal travels may correspond to a pre-defined distance located above the surface 106.

The receiver 208 may comprise suitable logic, circuitry, interfaces, and/or code that may be operable to receive data and messages. The receiver 208 may receive data in accordance with various known communication protocols. In an embodiment, the receiver 208 may receive the signal generated by the sensors 206 external to the apparatus 104. The receiver 208 may implement known technologies for supporting wired or wireless communication between the apparatus 104 and the sensors 206 external to the apparatus 104.

The transmitter 210 may comprise suitable logic, circuitry, interfaces, and/or code that may be operable to transmit data and/or messages. The transmitter 210 may transmit data, in accordance with various known communication protocols. In an embodiment, the transmitter 210 may transmit a control signal to operate the user interface of the device 102.

In operation, the apparatus 104 may be coupled to the surface 106. A user may interact with the surface 106 using the object 108. The apparatus 104 may allow a user to operate the user interface of the device 102 based on the interaction with the surface 106. The user may interact within a pre-defined distance from the surface 106 to operate the user interface of the device 102. In an embodiment, a user may interact with the surface 106 using a hand. For example, a user may move the object 108 (such as rotate a hand) clockwise within the pre-defined distance to form a closed region. In another example, a user may move the object 108 (such as rotate a hand) counter-clockwise within a pre-defined distance to form a closed region. In another embodiment, a user may perform a gesture within the pre-defined distance using the object 108. An example of the gesture may be drawing a closed shape.

In response to the interaction of the object 108 with the surface 106, the sensors 206 may sense the movement of the object 108 within the pre-defined distance. The sensors 206 may generate one or more signals that correspond to the sensed movement. The processor 202 may generate a control signal that corresponds to the generated one or more signals to operate the user interface of the device 102.

The sensors 206 may be operable to track a movement of the object 108 along a path within a pre-defined distance. The sensors 206 may be operable to track a movement by determining one or more locations of the object 108 along a path. The processor 202 may be operable to represent each of the determined one or more locations in a two-dimensional (2D) coordinate system. The processor 202 may be operable to determine a pair of coordinates in a 2D coordinate system corresponding to each of the one or more determined locations. Each pair of coordinates may correspond to a point in the 2D coordinate system. Each point in the 2D coordinate system represents a location of the object 108 while moving along a path within a pre-defined distance. Each of the determined pairs of coordinates is indicative of the position of the determined one or more locations of the object 108 in the 2D coordinate system.

A plurality of points corresponding to a plurality of pairs of coordinates in the 2D coordinate system, when connected together, may form a closed region. An example of such a closed region may be a polygon. The processor 202 may determine the closed region formed by the plurality of points. The processor 202 may determine an area of the determined closed region. The processor 202 may further determine a polarity of the determined area. The polarity of the determined area may be positive or negative. In an embodiment, the processor 202 may determine an area of a closed region and a polarity of the area based on vector analysis.

The processor 202 may be operable to determine a direction of movement of the object 108 based on the determined polarity of the area of the closed region. For example, a positive polarity of the determined area may correspond to a clockwise movement of the object 108. In another example, a negative polarity of the determined area may correspond to a counter-clockwise movement of the object 108. The determined direction of movement corresponds to an operation associated with the device 102.

The processor 202 may generate a control signal based on the determined direction of movement. The control signal may correspond to an operation of the device 102 to be operated in response to the movement. The processor 202 may communicate the generated control signal to the device 102 via the transmitter 210. The device 102 may process the received control signal and perform the operation that corresponds to the control signal. In an embodiment, the processor 202 may determine a control signal that corresponds to the determined direction of movement based on direction-operation mapping data stored in the memory 204. The direction-operation mapping data may specify an operation of the device 102 to be operated in response to a movement of the object 108 within a pre-defined distance.

In an embodiment, the direction-operation mapping data may be pre-defined. In an embodiment, the manufacturer associated with the apparatus 104 may define an operation of the device 102 that corresponds to a direction of movement of the object 108 within a pre-defined distance. In another embodiment, a user operating the apparatus 104 may define an operation of the device 102 to be operated that corresponds to a direction of movement of the object 108 within a pre-defined distance. For example, the manufacturer and/or the user may define that a clockwise movement of the object 108 may correspond to volume-up control operation of a television. Hence, by moving the object 108 clockwise, a user may increase volume of the television. In another example, the manufacturer and/or the user may define that a counter-clockwise movement of the object 108 may correspond to channel change operation of a television. Thus, by moving the object 108 counter-clockwise, a user may change channels of the television. In an embodiment, a user may customize a pre-defined mapping defined by the manufacturer.

In an embodiment, the processor 202 may receive one or more configuration settings that correspond to the apparatus 104. Examples of the one or more configuration settings may include, but are not limited to, one or more settings associated with the sensors 206 and/or one or more operations to be performed by the device 102 in response to a movement of the object 108 within a pre-defined distance from the surface 106. In an embodiment, the processor 202 may allow a user to configure the one or more configuration settings. In another embodiment, the manufacturer of the apparatus 104 may specify the one or more configuration settings. The one or more configuration settings may be stored in the memory 204.

In an embodiment, the processor 202 may be operable to register one or more devices (such as the device 102). In an embodiment, the processor 202 may prompt a user to specify the one or more devices with which a user may interact using the apparatus 104. The processor 202 may register the one or more devices as specified by the user. In an embodiment, the processor 202 may communicate the generated control signal to the registered device.

In an embodiment, the processor 202 may search for one or more devices to interact with based on receiving an identification signal from the one or more devices. In another embodiment, the transmitter 210 may transmit the identification signal to the one or more devices. The processor 202 may receive an acknowledgement of the identification signal from the one or more devices. The processor 202 may register the one or more devices that may acknowledge the transmitted identification signal as the devices with which the apparatus 104 may interact. Examples of the identification signal may include, but are not limited to, a radio frequency signal, an infrared signal, an ultra high frequency signal, and the like. In an embodiment, the manufacturer of the apparatus 104 may specify the device 102 with which the apparatus 104 may interact.

Figure 3:
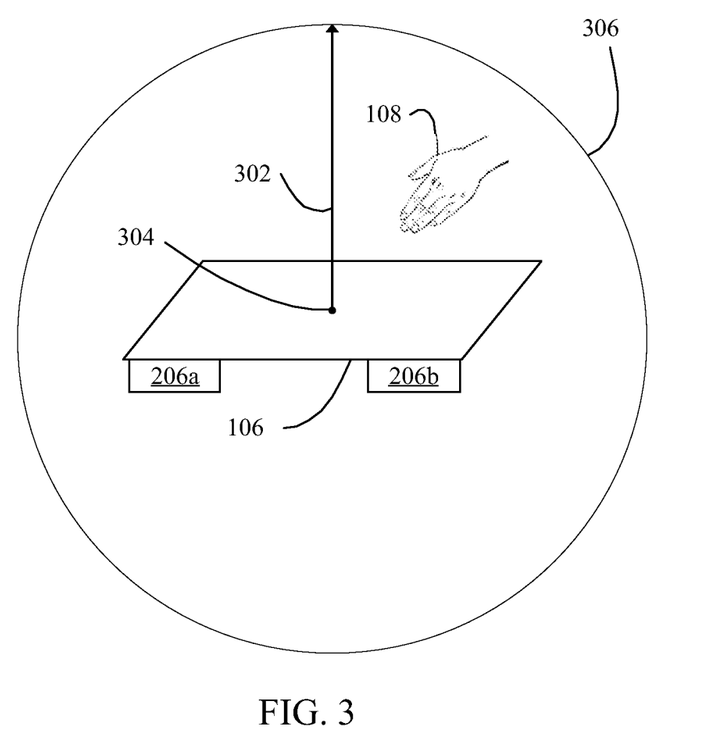
FIG. 3 is a diagram illustrating an example of a pre-defined distance within which an object may move, in accordance with an embodiment of the disclosure.

FIG. 3 is a diagram illustrating an example of a pre-defined distance within which an object may move, in accordance with an embodiment of the disclosure. FIG. 3 is described in conjunction with the block diagrams of FIG. 1 and FIG. 2.

With reference to FIG. 3, there is shown the surface 106, a pre-defined distance 302 from a point 304 on the surface 106, an operating space 306, the first sensor 206a, and the second sensor 206b. The first sensor 206a and the second sensor 206b may create the operating space 306 at the pre-defined distance 302 on either side, above and/or below the surface 106.

The point 304 may correspond to any point on the surface 106. A location of the point 304 on the surface 106 may be selected based on one or more of: size of the surface 106, shape of the surface 106, sensitivity of the first sensor 206a and/or the second sensor 206b, surface area detected by the first sensor 206a and/or the second sensor 206b, and/or a required size, location, and/or an orientation of the operating space 306. Notwithstanding, the disclosure may not be so limited and the location of the point 304 on the surface 106 may be selected based on other factors without limiting the scope of the disclosure.

The pre-defined distance 302 may be above and/or below the surface 106 such that the operating space 306 may extend above and/or below the surface 106. The pre-defined distance 302 may be determined based on the sensitivity of the first sensor 206a and the second sensor 206b. The pre-defined distance 302 may depend on a surface area detected by the first sensor 206a and the second sensor 206b.

In an embodiment, the pre-defined distance 302 from the point 304 may be determined in such a way that the operating space 306 may enclose the surface 106. For example, the first sensor 206a and the second sensor 206b may be located on opposite edges of a table. The point 304 may be determined such that the point 304 is equidistant from the first sensor 206a and the second sensor 206b. The pre-defined distance 302 may be determined such that the operating space 306 is created around the table. A user may move the object 108 within the operating space 306 around the table.

In another embodiment, the pre-defined distance 302 may be determined in such a way that the operating space 306 may be associated with a part of the surface 106. For example, the first sensor 206a and the second sensor 206b may be located near a center of a table. The point 304 may be determined such that the center of the table corresponds to the point 304. The pre-defined distance 302 may be determined such that the operating space 306 encloses a part of the table around the center of the table. A user may move the object 108 within the operating space 306 above the center of the table. Notwithstanding, the disclosure may not be so limited and the pre-defined distance 302 may be determined in any other way without limiting the scope of the disclosure.

In an embodiment, as shown in FIG. 3, the operating space 306 may correspond to a sphere of radius equal to the pre-defined distance 302. In another embodiment, the operating space 306 may be an irregular shape with different pre-defined distances from the surface 106. Notwithstanding, the disclosure may not be so limited and the operating space 306 may be of any shape without limiting the scope of the disclosure. A location, size, shape, sensitivity level, and/or an orientation of the operating space 306 may depend on the position of one or both of the first sensor 206a and/or the second sensor 206b. In an embodiment, the first sensor 206a and the second sensor 206b on the surface 106 may be at a fixed and unchanging position relative to one another. Thus, the pre-defined distance 302, and a size, shape, location, orientation, and/or sensitivity level of the operating space 306 would remain fixed. In another embodiment, a user may adjust a position of the first sensor 206a with respect to the position of the second sensor 206b. Thus, a user may adjust the pre-defined distance 302, and a size, location, shape, orientation, and/or sensitivity level of the operating space 306.

Figure 4:
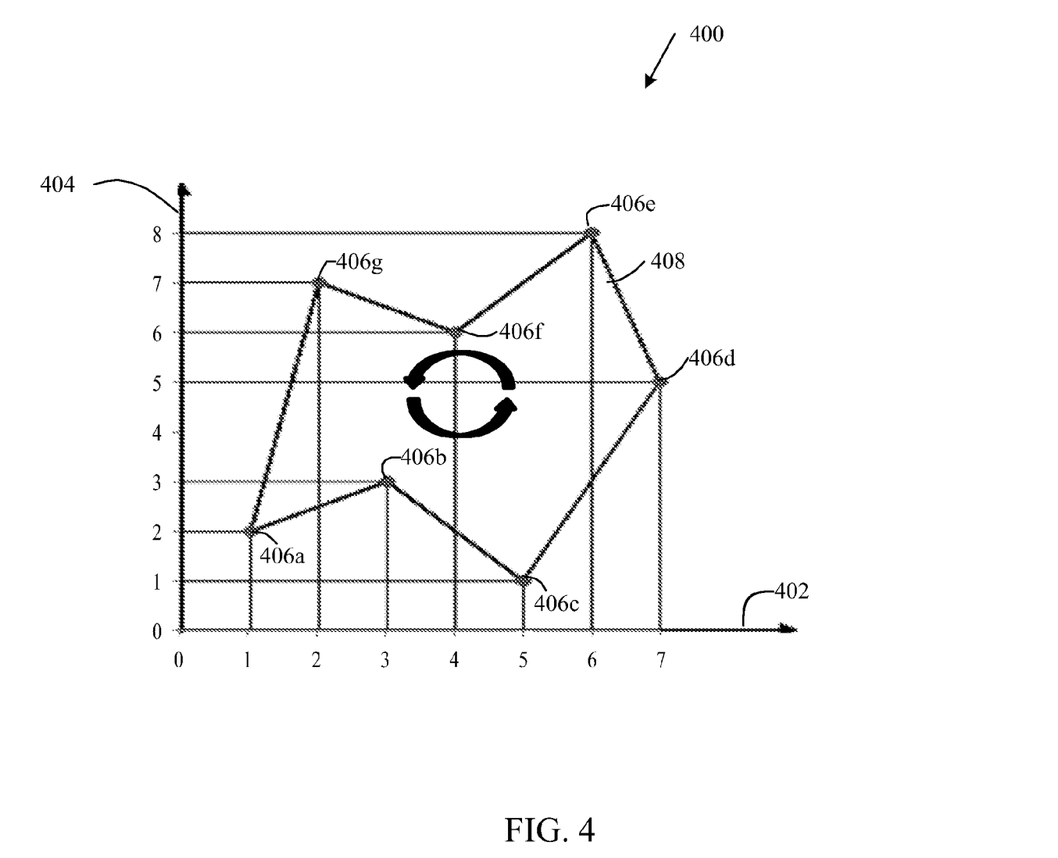
FIG. 4 is a diagram illustrating an example of determining a direction of movement of an object based on vector analysis, in accordance with an embodiment of the disclosure.

FIG. 4 is a diagram illustrating an example of determining a direction of movement of an object based on vector analysis, in accordance with an embodiment of the disclosure. FIG. 4 is described in conjunction with the block diagrams of FIG. 1 and FIG. 2. The example of determining a direction of movement of an object based on vector analysis is explained with reference to a Cartesian coordinate system. Notwithstanding, the disclosure may not be so limited and any other 2D coordinate system may be used without limiting the scope of the disclosure.

In reference to FIG. 4, there is shown a 2D Cartesian coordinate system 400. The Cartesian coordinate system 400 comprises an X-axis 402, a Y-axis 404, and a plurality of points, such as a first point 406a, a second point 406b, and the like. The first point 406a, the second point 406b, and the like, may be collectively referred to as a plurality of points 406. The plurality of points 406, when connected, may form a closed region 408.

The sensors 206 may track a movement of the object 108 along a path while moving within a pre-defined distance from the surface 106. The sensors 206 may track the movement by determining one or more locations of the object 108 along the path. The plurality of points 406 may correspond to the determined one or more locations of the object 108 along the path traversed by the object 108.

Each point in the Cartesian coordinate system 400 (for example, the first point 406a and the second point 406b) is associated with a pair of coordinates. The processor 202 may determine a pair of coordinates in the Cartesian coordinate system 400 corresponding to each of the one or more determined locations. Each pair of coordinates in the Cartesian coordinate system 400 may comprise an X coordinate and a Y coordinate. Table 1 illustrates X coordinates and Y coordinates corresponding to each point of the Cartesian coordinate system 400.

TABLE 1

| k | 1 | 2 | 3 | 4 | 5 | 6 | 7 | 1 |
|---|---|---|---|---|---|---|---|---|
| $X_k$ | 1 | 3 | 5 | 7 | 6 | 4 | 2 | 1 |
| $Y_k$ | 2 | 3 | 1 | 5 | 8 | 6 | 7 | 2 |
| $X_k - X_{k+1}$ | −2 | −2 | −2 | 1 | 2 | 2 | 1 | −2 |
| $Y_k + Y_{k+1}$ | 5 | 4 | 6 | 13 | 14 | 13 | 9 | 5 |
| Product | −10 | −8 | −12 | 13 | 28 | 26 | 9 | −10 |

As shown in Table 1, $X_k$ corresponds to an X coordinate value and $Y_k$ corresponds to a Y coordinate value corresponding to a $k^{th}$ point in the Cartesian coordinate system 400. For example, X coordinate value ($X_1$) corresponding to the first point 406a is 1 and Y coordinate value ($Y_1$) corresponding to the first point 406a is 2.

The processor 202 may determine a difference between X coordinate values of each pair of subsequent points in the Cartesian coordinate system 400. For example, the processor 202 may determine a difference between the X coordinate value of the first point 406a and the X coordinate value of the second point 406b. Similarly, the processor 202 may determine differences between X coordinate values of the second point 406b and a third point 406c, X coordinate values of the third point 406c and a fourth point 406d, and so forth. Table 1 shows an example difference between the X coordinate values of pairs of subsequent points as $X_k - X_{k+1}$. For example, as shown in Table 1, a difference ($X_1 - X_2$) between X coordinate value ($X_1 = 1$) of the first point 406a and X coordinate value ($X_2 = 3$) of the second point 406b is equal to −2.

Similarly, the processor 202 may determine a sum of Y coordinate values of each pairs of subsequent points in the Cartesian coordinate system 400. For example, the processor 202 may determine a sum of Y coordinate value of the first point 406a and Y coordinate value of the second point 406b. Similarly, the processor 202 may determine sum of Y coordinate values of the second point 406b and the third point 406c, Y coordinate values of the third point 406c and the fourth point 406d, and so forth. Table 1 shows an example sum of Y coordinate values of pairs of subsequent points as $Y_k + Y_{k+1}$. For example, as shown in Table 1, a sum ($Y_1 + Y_2$) of Y coordinate value ($Y_1 = 2$) of the first point 406a and Y coordinate value ($Y_2 = 3$) of the second point 406b is equal to 5.

The processor 202 may determine a product of the determined difference between X coordinate values and the determined sum of Y coordinate values, which correspond to a pair of subsequent points. In table 1, Product shows the determined product. For example, a pair of subsequent points may be the first point 406a and the second point 406b. The processor 202 may determine a product of the difference between X coordinate values ($X_1 - X_2 = -2$) of the pair of the first point 406a and the second point 406b and the sum of Y coordinate values ($Y_1 + Y_2 = 5$) of the pair of first point 406a and the second point 406b. As shown in Table 1, the determined product (($X_1 - X_2$)×($Y_1 + Y_2$)) is equal to −10. The processor 202 may determine the product for each pair of the subsequent points.

The processor 202 may determine a sum of the determined products for each pair of the subsequent points. The processor 202 may determine an area of the closed region 408 formed by the plurality of points 406 based on the determined sum of the determined products for each pair of the subsequent points. In an embodiment, the processor 202 may determine an area of the closed region 408 based on the equation:

$$\text{Area} = \frac{1}{2} \sum_{k=1}^{n} (X_k - X_{k+1})(Y_k + Y_{k+1})$$

The processor 202 may determine a polarity of the area of the closed region 408. The polarity of the area of the closed region 408 corresponds to a direction of a movement of the object 108. The direction of the movement of the object 108 corresponds to an operation associated with the device 102. For example, in reference to Table 1, an area of the closed region 408 may be determined as Area=(−10−8−12+13+28+26+9)/2=+23

The polarity of the determined area of the closed region 408 is positive. The positive polarity of the determined area may correspond to a clockwise movement of the object 108. The clockwise movement of the object 108 may correspond to switching on a home appliance, for example.

Figure 5:
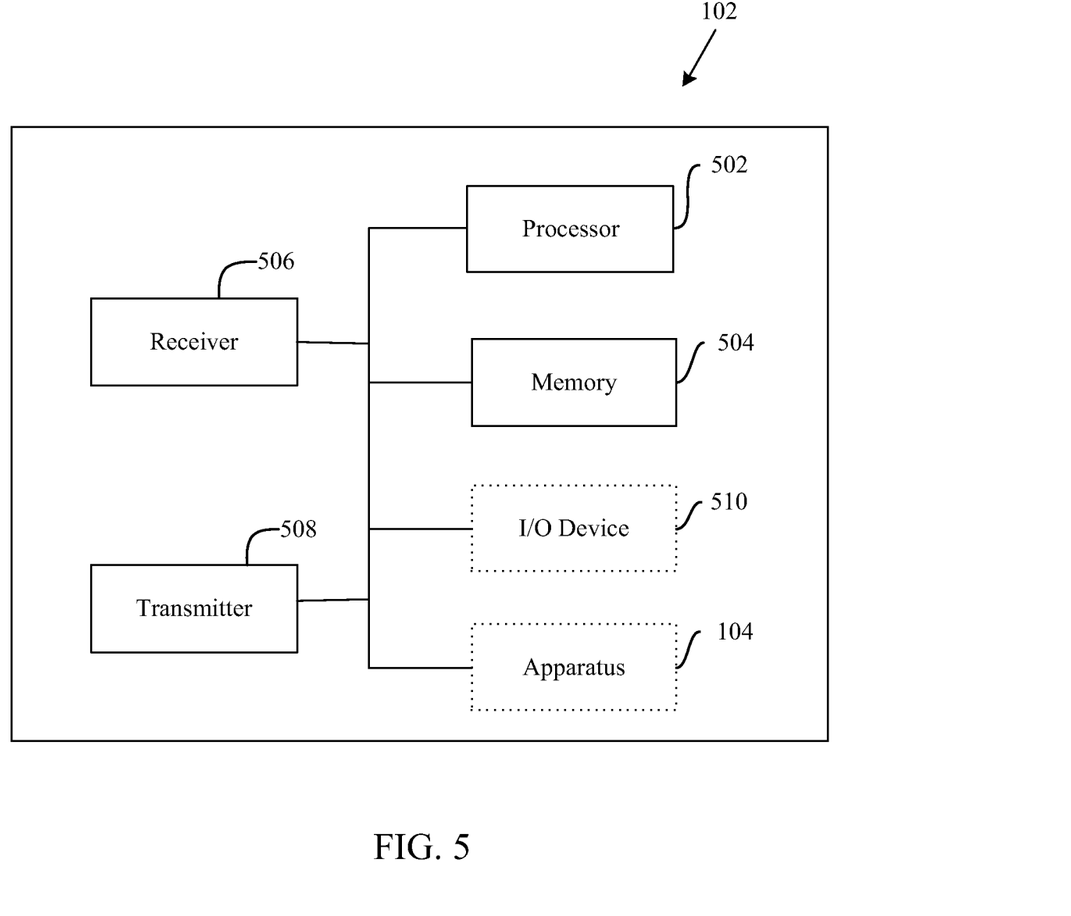
FIG. 5 is a block diagram of an exemplary device that may be operated based on a movement of an object within a pre-defined distance, in accordance with an embodiment of the disclosure.

FIG. 5 is a block diagram of an exemplary device that may be operated based on a movement of an object within a pre-defined distance, in accordance with an embodiment of the disclosure. The block diagram of FIG. 5 is described in conjunction with the block diagrams of FIG. 1 and FIG. 2.

In reference to FIG. 5, there is shown the device 102. The device 102 may comprise one or more processors and/or circuits, such as a processor 502, a memory 504, a receiver 506, and a transmitter 508, an input/output device 510 (hereinafter referred to as I/O device 510), and the apparatus 104. The I/O device 510 and the apparatus 104 may be optional as represented by dashed box in the block diagram of FIG. 5.

The processor 502 and/or the one or more circuits may be communicatively coupled to the memory 504, the receiver 506, the transmitter 508, and the I/O device 510.

The processor 502 and/or the one or more circuits may comprise suitable logic, circuitry, and/or interfaces that may be operable to execute at least one code section stored in the memory 504. The processor 502 may be implemented based on a number of processor technologies known in the art. Examples of the processor 502 may include, but are not limited to, an X86-based processor, a Reduced Instruction Set Computing (RISC) processor, an Application-Specific Integrated Circuit (ASIC) processor, and/or a Complex Instruction Set Computer (CISC) processor.

The memory 504 may comprise suitable logic, circuitry, interfaces, and/or code that may be operable to store a machine code and/or a computer program having the at least one code section executable by the processor 502. Examples of implementation of the memory 504 may include, but are not limited to, Random Access Memory (RAM), Read Only Memory (ROM), Hard Disk Drive (HDD), and/or a Secure Digital (SD) card. The memory 504 may further be operable to store data, such as configuration settings of the device 102, configuration settings of the apparatus 104, signal-operation mapping data, and/or any other data.

The receiver 506 may comprise suitable logic, circuitry, interfaces, and/or code that may be operable to receive data and messages. The receiver 506 may receive data in accordance with various known communication protocols. In an embodiment, the receiver 506 may receive a control signal from the apparatus 104. In another embodiment, the receiver 506 may receive an identification signal from the apparatus 104. The receiver 506 may implement known technologies for supporting wired or wireless communication with the apparatus 104 via a communication network.

The transmitter 508 may comprise suitable logic, circuitry, interfaces, and/or code that may be operable to transmit data and/or messages. The transmitter 508 may transmit data in accordance with various known communication protocols. In an embodiment, the transmitter 508 may transmit an identification signal to the apparatus 104.

The I/O device 510 may comprise various input and output devices that may be operably coupled to the processor 502. The I/O device 510 may comprise suitable logic, circuitry, interfaces, and/or code that may be operable to receive input from a user operating the device 102 and provide an output. Examples of the input devices may include, but are not limited to, a keypad, a stylus, and/or a touch screen. Examples of the output devices may include, but are not limited to, a display and a speaker.

In an embodiment, the apparatus 104 may be integrated with the device 102. In such a case, any surface associated with the device 102 may correspond to the surface 106 for the apparatus 104. In an embodiment, the body of the device 102 may correspond to the surface 106. For example, a cover of a remote control may be used as the surface 106 to interact with the remote control. The sensors 206 of the apparatus 104 may create a pre-defined distance above and/or below the cover of the remote control. A user operating the remote control may move the object 108 (for example, a hand) within the pre-defined distance associated with the cover of the remote control. The apparatus 104 may generate a control signal to operate various operations of the remote control in response to a movement of the object 108 relative to the cover of the remote control.

In another embodiment, a surface in contact with the device 102 may correspond to the surface 106. For example, a surface of a table on which a mobile phone is placed may be used as the surface 106 for interacting with the mobile phone. The sensors 206 of the apparatus 104 may create a pre-defined distance above and/or below the table. A user may operate the mobile phone by moving the object 108 (for example, a hand) within the pre-defined distance associated with the table. The apparatus 104 may generate a control signal in response to a movement of the object 108 relative to the table to switch on and/or switch off the mobile phone.

In operation, a user may interact with the surface 106 using the object 108. The sensors 206 of the apparatus 104 may create an operating space at a pre-defined distance above and/or below the surface 106. A user may move the object 108 relative to the surface 106 within the pre-defined distance. For example, a user may move the object 108 clockwise and/or counter clockwise such that a closed region is formed as a result of the movement of the object 108. The apparatus 104 may detect a movement of the object 108 within the pre-defined distance. The apparatus 104 may determine a direction of the movement. The apparatus 104 may generate a control signal in response to the determined direction of the movement. The apparatus 104 may communicate the generated control signal to the processor 502 and/or the one or more circuits to operate the user interface of the device 102. The processor 502 and/or the one or more circuits may receive the transmitted control signal from the apparatus 104, via the receiver 506. The received control signal may correspond to an operation of the device 102 to be operated in response to the interaction. The processor 502 and/or the one or more circuits may determine an operation of the device 102 to be operated based on the received control signal. The processor 502 and/or the one or more circuits may operate a user interface of the device 102 based on the determined operation.

In an embodiment, the processor 502 and/or the one or more circuits may determine the operation of the device 102 to be operated based on the signal-operation mapping data stored in the memory 504. The signal-operation mapping data may specify an operation of the device 102 to be operated corresponding to a received control signal. The signal-operation mapping data stored in the memory 504 of the device 102 may correspond to the direction-operation mapping data stored in the memory 204 of the apparatus 104. In an embodiment, a user may store the signal-operation mapping data that corresponds to the direction-operation mapping data in the memory 504. In another embodiment, the apparatus 104 may transmit the signal-operation mapping data that corresponds to the direction-operation mapping data to the processor 502 and/or the one or more circuits.

Figure 6:
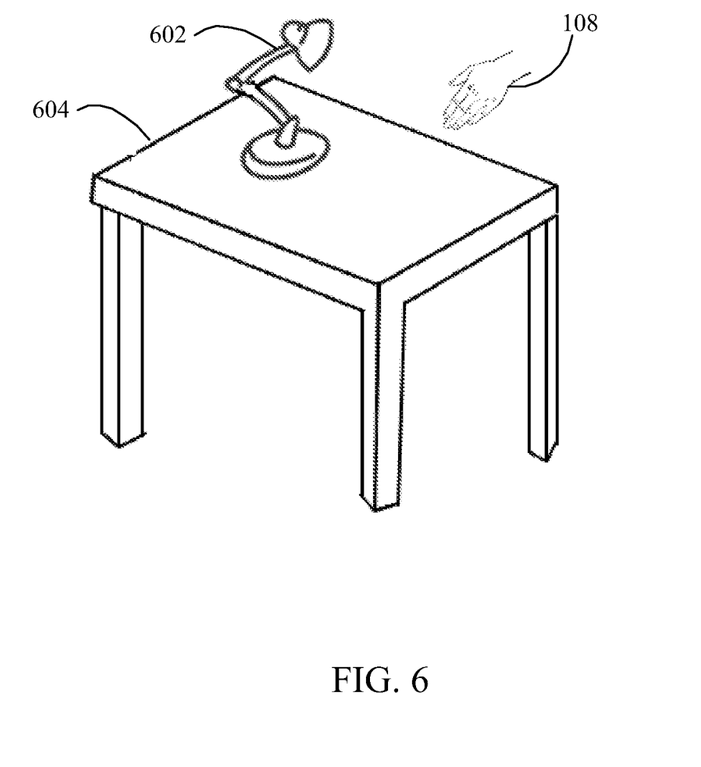
FIG. 6 is a diagram illustrating an example implementation of operation of a lamp based on a movement of an object within a pre-defined distance, in accordance with an embodiment of the disclosure.

FIG. 6 is a diagram illustrating an example implementation of operating a lamp based on a movement of an object within a pre-defined distance, in accordance with an embodiment of the disclosure. FIG. 6 is described in conjunction with the block diagrams of FIG. 1, FIG. 2, and FIG. 5.

In reference to FIG. 6, there is shown a lamp 602 and a table 604. The lamp 602 may be placed on the table 604, for example. The apparatus 104 may be coupled to the table 604 (not shown in FIG. 6). In an embodiment, the apparatus 104 may be fixed under the table top. Notwithstanding, the disclosure may not be so limited and the apparatus 104 may be connected to other parts of the table 604 without limiting the scope of the disclosure.

The table 604 may correspond to the surface 106. The sensors 206 of the apparatus 104 may create an operating space at a pre-defined distance above and/or below the table 604. The apparatus 104 may be operable to interact with the lamp 602. A user associated with the lamp 602 may move the object 108 (for example, a hand) relative to the table 604. A user may move the object 108 within the pre-defined distance associated the table 604 to operate a user interface of the lamp 602. For example, a user may move the object 108 within the pre-defined distance clockwise to operate the lamp 602. A user may form a closed region by moving the object 108 within the pre-defined distance. The sensors 206 of the apparatus 104 may detect the movement of the object 108 relative to the table 604. The sensors 206 may generate one or more signals in response to the detected movement of the object 108. The processor 202 of the apparatus 104 may determine a direction of movement of the object 108. Based on the determined direction of movement, the processor 202 may generate a control signal to operate the lamp 602. The apparatus 104 may communicate the control signal to the lamp 602. For example, a control signal that corresponds to a clockwise movement of the object 108 may correspond to a command to switch off the lamp 602. Based on the received control signal, the lamp 602 may be switched off. In another example, a control signal that corresponds to a counter-clockwise movement of the object 108 may correspond to a command to switch on the lamp 602. Based on the received control signal, the lamp 602 may be switched on.

In another example implementation, a table on which a laptop is placed may correspond to the surface 106. The apparatus 104 may be coupled to the bottom surface of the table. The sensors 206 of the apparatus 104 may create a pre-defined distance on the table to convert the table into an input mechanism. A user may move the object 108 (such as a hand and/or a prosthetic device) clockwise within the created pre-defined distance such that a closed region is formed as a result of the clockwise movement. The sensors 206 may detect the clockwise movement of the object 108 within the pre-defined distance. Based on the detected movement, the sensors 206 may generate a signal. The processor 202 may determine a direction of the movement based on the generated signal. The processor 202 may generate a control signal that corresponds to the determined direction. The generated control signal that corresponds to the clockwise movement of the object 108 may correspond to a right button of a mouse associated with the laptop. Similarly, a user may move the object 108 counter-clockwise within the pre-defined distance. The processor 202 may determine a direction of the movement based on the generated signal. The processor 202 may generate a control signal that corresponds to the counter-clockwise movement. The generated control signal that corresponds to the counter-clockwise movement may correspond to a left button of the mouse associated with the laptop, for example.

Notwithstanding, the disclosure may not be limited only to the above example implementations of the surface 106, interactions, and/or the device 102 that may be operated. Any surface may be used as the surface 106 for interacting with different types of devices using various types of interactions without limiting the scope of the disclosure.

Figure 7:
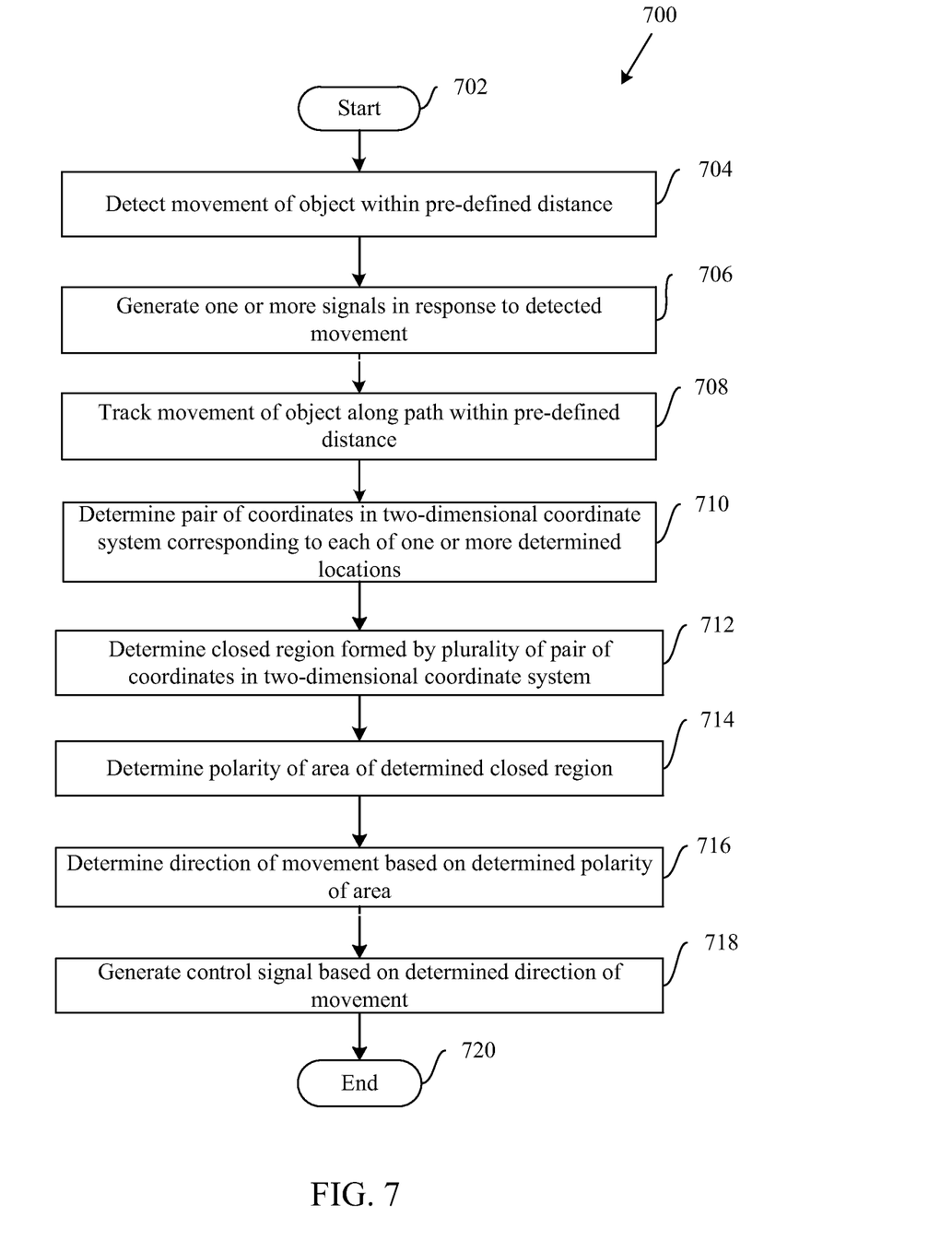
FIG. 7 is a flow chart illustrating exemplary steps for generating a control signal in an apparatus for operating a user interface of a device based on a movement of an object within a pre-defined distance, in accordance with an embodiment of the disclosure.

FIG. 7 is a flow chart illustrating exemplary steps for generating a control signal in an apparatus for operating a user interface of a device based on a movement of an object within a pre-defined distance, in accordance with an embodiment of the disclosure. In reference to FIG. 7, there is shown a method 700. The method 700 is described in conjunction with the block diagram of FIG. 1 and FIG. 2.

The method begins at step 702. At step 704, the sensors 206 may detect a movement of the object 108 within a pre-defined distance from the surface 106. At step 706, the sensors 206 may generate one or more signals in response to the detected movement. At step 708, the sensors 206 may track the movement of the object 108 along a path within the pre-defined distance. The sensors 206 may track the movement by determining one or more locations of the object 108 along the path. At step 710, the processor 202 may determine a pair of coordinates in a 2D coordinate system corresponding to each of the one or more determined locations. Each of the determined pair of coordinates is indicative of the position of each of the determined one or more locations on the 2D coordinate system. At step 712, the processor 202 may determine a closed region formed by a plurality of the pair of coordinates in the 2D coordinate system. At step 714, the processor 202 may determine a polarity of an area of the determined closed region. In an embodiment, the processor 202 may determine a polarity of an area of the determined closed region based on vector analysis. At step 716, the processor 202 may determine a direction of the movement based on the determined polarity of the area. The determined direction of the movement corresponds to an operation associated with the device 102. At step 718, the processor 202 may generate a control signal based on the determined direction of the movement. The control signal may correspond to the one or more generated signals to operate the user interface of the device 102. The method 700 ends at step 720.

Although various embodiments of the disclosure have been described with reference to implementation in an apparatus and/or a method for operating a user interface of a device, the disclosure may not be so limited. Various embodiments of the disclosure may also be implemented in apparatus and methods performing other operations without limiting the scope of the disclosure. An example of such an operation may be to detect the presence of a user and/or an object in any given area, such as a room. Another example may be determining a direction of movement of an object and/or a user in a room. Based on the detected presence, the detected movement, and/or the detected direction of movement, one or more operations of one or more devices present in the room may be operated.

In an embodiment, the apparatus 104 may be implemented to operate a device within a room based on a movement of air in the room. The apparatus 104 may be operable to interact with one or more devices in the room. A lamp and/or a fan may be examples of a device with which the apparatus 104 may interact.

In an embodiment, the apparatus 104 may be coupled to a floor and/or a ceiling of a room. For example, the apparatus 104 may be embedded in the floor and/or the ceiling such that the sensors 206 may be operable to detect a movement of air in the room. Notwithstanding, the disclosure may not be so limited and the apparatus 104 may be placed at various locations in the room floor without limiting the scope of the disclosure. In an embodiment, a single apparatus may interact with one or more devices in a room. In another embodiment, each device in a room may be operated by a separate apparatus.

The sensors 206 of the apparatus 104 may detect a movement of air in the room caused by a movement of a user and/or objects in the room, and/or any other factors. The processor 202 of the apparatus 104 may determine the direction of movement of the air. The processor 202 may generate a control signal that corresponds to the detected direction of movement of the air. The processor 202 may operate the various devices (such as a lamp and a fan) in the room in accordance to the generated control signal. In another example, based on the detected movement, the processor 202 may be operable to determine environmental changes, such as an earthquake and/or a cyclone.

In accordance with an embodiment of the disclosure, an apparatus 104 (FIG. 1) for operating a user interface of a device 102 (FIG. 1) may comprise a plurality of sensors, such as sensors 206 coupled to a surface 106 (FIG. 1). The plurality of sensors may be operable to detect a movement of an object 108 (FIG. 1) within a pre-defined distance 302 (FIG. 3) from the surface 106. The plurality of sensors may be operable to generate one or more signals in response to the detected movement. The apparatus 104 may further comprise one or more processors, such as a processor 202 (FIG. 2) communicatively coupled to the plurality of sensors. The one or more processors may be operable to generate a control signal that corresponds to the one or more generated signals to operate the user interface of the device 102.

The pre-defined distance 302 is based on a surface area detected by the plurality of sensors. The pre-defined distance 302 extends above and/or below the surface 106. The plurality of sensors may be operable to track the movement of the object 108 along a path within the pre-defined distance 302. The plurality of sensors may track the movement by determining one or more locations of the object 108 along the path. The one or more processors may be operable to determine a pair of coordinates in a 2D coordinate system, such as a Cartesian coordinate system 400 (FIG. 4), corresponding to each of the one or more determined locations, such as a pair of coordinates $(X_k, Y_k)$ corresponding to a plurality of points 406 (FIG. 4). Each of the determined pair of coordinates $(X_k, Y_k)$ is indicative of a position of each of the determined one or more locations in the 2D coordinate system. The one or more processors may be operable to determine a closed region 408 (FIG. 4) formed by a plurality of the determined pair of coordinates in the 2D coordinate system. The one or more processors may be operable to determine a polarity of an area of the determined closed region 408. The one or more processors may be operable to determine a direction of the movement based on the determined polarity of the area. The determined direction of the movement corresponds to an operation associated with the device 102.

The movement comprises one or both of: a clockwise movement and/or a counter-clockwise movement resulting in the determined closed region. The plurality of sensors comprises an ultrasonic sensor and/or an infra-red sensor.

In accordance with an embodiment of the disclosure, a device 102 (FIG. 1) for interaction may comprise one or more processors, such as a processor 502 (FIG. 5) and/or circuits. The device 102 is communicatively coupled to an apparatus 104 (FIG. 1). The one or more processors and/or circuits may be operable to receive a control signal from the apparatus 104. The control signal may be generated by the apparatus 104 in response to detection of a movement of an object 108 (FIG. 1) within a pre-defined distance 302 from a surface 106 (FIG. 1). The one or more processors and/or circuits may be operable to operate a user interface of the device 102 based on the received control signal. The movement comprises one or both of: a clockwise movement and/or a counter-clockwise movement resulting in a closed region.

Other embodiments of the disclosure may provide a non-transitory computer readable medium, and/or storage medium, and/or a non-transitory machine-readable medium and/or storage medium, having stored thereon, a machine code and/or a computer program having at least one code section executable by a machine and/or a computer, thereby causing the machine and/or computer to perform the steps comprising detecting a movement of an object within a pre-defined distance from a surface. One or more signals may be generated in response to the detected movement. A control signal may be generated corresponding to the one or more generated signals to operate the user interface of the device.

Accordingly, the present disclosure may be realized in hardware, or a combination of hardware and software. The present disclosure may be realized in a centralized fashion, in at least one computer system, or in a distributed fashion, where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to various embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An apparatus for operating a user interface of a device, said apparatus comprising:
   a plurality of sensors, wherein said plurality of sensors are configured to be coupled to a surface, wherein said plurality of sensors are operable to:
      detect a movement of an object within a pre-defined distance from said surface; and
      generate one or more signals in response to said detected movement; and
   one or more processors communicatively coupled to said plurality of sensors, wherein said one or more processors are operable to:
      determine at least three locations of said object obtained as a result of said movement based on said one or more signals generated by said plurality of sensors;
      determine a closed region formed by connecting said determined at least three locations of said object; and
      generate a control signal corresponding to said one or more generated signals, based on a polarity of an area of said determined closed region, to operate said user interface of said device.

2. The apparatus of claim 1, wherein said pre-defined distance is based on a surface area detected by said plurality of sensors.

3. The apparatus of claim 1, wherein said pre-defined distance extends above and/or below said surface.

4. The apparatus of claim 1, wherein said plurality of sensors are operable to track said movement of said object along a path within said pre-defined distance.

5. The apparatus of claim 4, wherein said plurality of sensors are operable to track said movement by determining said at least three locations of said object along said path.

6. The apparatus of claim 1, wherein said one or more processors are operable to determine a pair of coordinates in a two-dimensional coordinate system corresponding to each of said determined at least three locations.

7. The apparatus of claim 6, wherein each of said determined pair of coordinates is indicative of a position of each of said determined at least three locations in said two-dimensional coordinate system.

8. The apparatus of claim 7, wherein said closed region is formed by a plurality of said determined pair of coordinates in said two-dimensional coordinate system.

9. The apparatus of claim 1, wherein said one or more processors are operable to determine said polarity of said area of said determined closed region based on vector analysis.

10. The apparatus of claim 1, wherein said one or more processors are operable to determine a direction of said movement based on said polarity of said area, wherein said determined direction of said movement corresponds to an operation associated with said device.

11. The apparatus of claim 1, wherein said movement comprises one or both of: a clockwise movement and/or a counter-clockwise movement resulting in said determined closed region.

12. The apparatus of claim 1, wherein said plurality of sensors comprises an ultrasonic sensor and/or an infra-red sensor.

13. A method for operating a user interface of a device, said method comprising:
 detecting a movement of an object within a pre-defined distance from a surface;
 generating one or more signals in response to said detected movement;
 determining at least three locations of said object obtained as a result of said movement based on said generated one or more signals;
 determining a closed region formed by connecting said determined at least three locations of said object; and
 generating a control signal corresponding to said one or more generated signals, based on a polarity of an area of said determined closed region, to operate said user interface of said device.

14. The method of claim 13, further comprising tracking said movement of said object along a path within said pre-defined distance.

15. The method of claim 14, wherein said tracking comprises determining said at least three locations of said object along said path.

16. The method of claim 13, further comprising determining a pair of coordinates in a two-dimensional coordinate system corresponding to each of said determined at least three locations, wherein each of said determined pair of coordinates is indicative of a position of each of said determined at least three locations in said two-dimensional coordinate system.

17. The method of claim 16, wherein said closed region is formed by a plurality of said determined pair of coordinates in said two-dimensional coordinate system.

18. The method of claim 13, further comprising determining said polarity of said area of said determined closed region.

19. The method of claim 13, further comprising determining a direction of said movement based on said polarity of said area, wherein said determined direction of said movement corresponds to an operation associated with said device.

20. A device for interaction, said device comprising:
 one or more processors and/or circuits in said device that is configured to be communicatively coupled to an apparatus, wherein said one or more processors and/or circuits are operable to:
  receive a control signal from said apparatus, wherein said control signal is generated by said apparatus in response to detection of a movement of an object within a pre-defined distance from a surface, wherein said control signal is generated by said apparatus based on determination of a closed region formed by connecting at least three locations of said object obtained as a result of said movement and a polarity of an area of the closed region formed as a result of said movement; and
  operate a user interface of said device based on said received control signal.

21. The device of claim 20, wherein said movement comprises one or both of: a clockwise movement and/or a counter-clockwise movement resulting in said closed region.

22. The apparatus of claim 1, wherein said one or more processors are operable to determine a pair of an X coordinate and a Y coordinate in a two-dimensional coordinate system corresponding to each of said determined at least three locations of said object along a path within said pre-defined distance.

23. The apparatus of claim 22, wherein said one or more processors are operable to:
 determine a difference between X coordinates of each pair of subsequent locations of said object along said path;
 determine a sum of Y coordinates of said each pair of subsequent locations;
 determine a product of said determined difference between X coordinates and said determined sum of Y coordinates of said each pair of subsequent locations;
 determine a sum of plurality of said determined products for a plurality of said pairs of subsequent locations; and
 determine said polarity of said area of said determined closed region based on said determined sum of plurality of said determined products.

* * * * *